Figure 5:
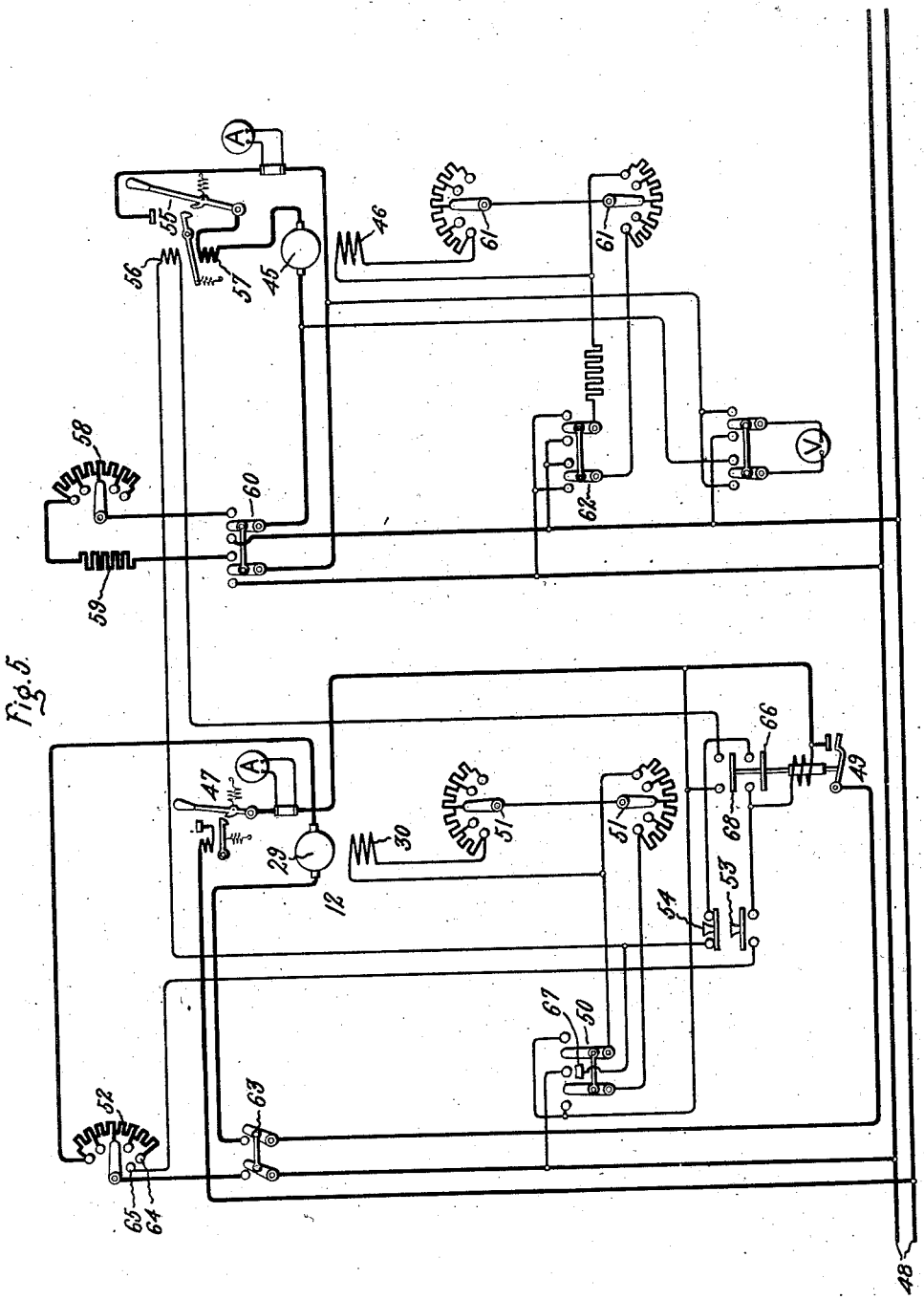

April 15, 1924.
C. F. SCOTT
TIRE TESTING DYNAMOMETER
Filed April 14, 1923
1,490,899
2 Sheets-Sheet 1
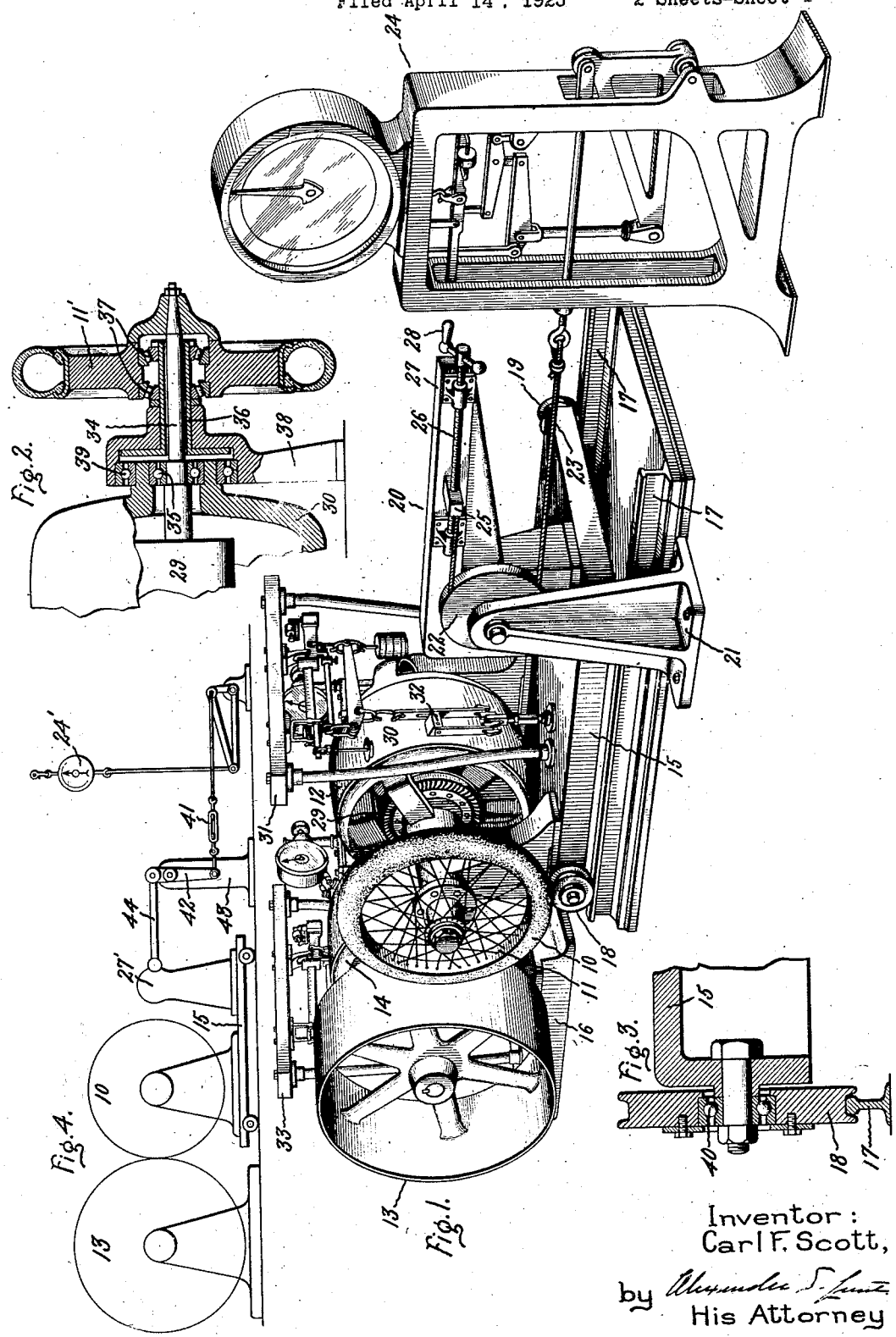
Inventor:
Carl F. Scott,
by *Alexander S. Lentz*
His Attorney April 15, 1924.

C. F. SCOTT 1,490,899

TIRE TESTING DYNAMOMETER

Filed April 14, 1923    2 Sheets-Sheet 2

Inventor:
Carl F. Scott,
by
His Attorney

Patented Apr. 15, 1924.

1,490,899

UNITED STATES PATENT OFFICE.

CARL F. SCOTT, OF YONKERS, NEW YORK, ASSIGNOR TO GENERAL ELECTRIC COMPANY, A CORPORATION OF NEW YORK.

TIRE-TESTING DYNAMOMETER.

Application filed April 14, 1923. Serial No. 632,151.

*To all whom it may concern:*

Be it known that I, CARL F. SCOTT, a citizen of the United States, residing at Yonkers, in the county of Westchester, State of New York, have invented certain new and useful Improvements in Tire-Testing Dynamometers, of which the following is a specification.

The object of my invention is to provide improved means for investigating the performance of automobile tires when required to transmit various amounts of energy at different speeds while subjected to different compressive loads simulating the stresses and reactions encountered in the actual service of the tire.

A further object of the invention is to provide an improved arrangement for testing the efficiency and losses of automobile tires, for testing the relative characteristics of different types of fabrics and materials used in the construction of tires, and for testing the life and endurance of tires at rated loads and at overloads to determine the relative endurance of different tire casings.

A further object of the invention is to provide an improved arrangement whereby the load on the tire being tested may be very nicely regulated.

A still further object of the invention is to provide a system of electrical interlocking connections whereby the motor which drives the tire and a generator which acts as a load may be effectively and safely controlled.

These and other objects of the invention, as will be either apparent to those skilled in the art or as will be pointed out fully hereinafter, are attained in the tire testing dynamometer and the control therefor as illustrated in the accompanying drawings.

In carrying the invention into effect in one form, I provide an arrangement whereby a dynamo electric machine operating as a motor is connected to operate a tire testing wheel and a dynamo electric machine operating as a generator is arranged so as to be run by power transmitted through the tire. In order to secure a variation of the load on the tire, the dynamo electric machines are mounted on relatively movable supports, and a tension device is provided for the purpose of regulating the pressure between the tire to be tested and the traction drum to which the generator is connected. The arrangement is preferably such that the tension device applies a pressure between the tire and the traction drum on a line connecting the shaft on which the traction drum is mounted, the shaft on which the tire testing wheel is mounted and the point of contact between the tire and the traction drum. By the provision of a tension device for regulating the pressure between the tire and the drum, adjustable pressure members are eliminated, and this is of advantage for the reason that adjustable pressure members are more likely to be subjected to bending stresses and binding forces than a tension device. The arrangement is preferably such that the platform on which the tire carrying wheel and its motor is mounted is freely movable back and forth along a runway, and the arrangement is also preferably such that a floating type axle and bearing construction is provided for the tire carrying wheel, so that an extremely heavy pressure may be applied to the tire without necessitating a very heavily constructed shaft or bearing. The interlocking connections between the motor and the generator of the dynamometer are preferably such that an automatic circuit breaker in the circuit of the generator and a contactor in the circuit of the motor are both automatically opened in response to abnormal circuit conditions, thereby automatically protecting the equipment from over speed, no voltage conditions, etc.

For a better understanding of the invention, reference is had to the accompanying drawings wherein Fig. 1 is a perspective view of a tire testing dynamometer in accordance with the invention. Fig. 2 is a detail showing the floating type axle construction preferred for the mounting of the tire carrying wheel and the shaft of the dynamo electric machine which operates as a motor to drive the tire to be tested. Fig. 3 is a detail showing the ball bearing construction of the rollers for the support which carries the tire to be tested and the dynamo electric machine provided for the purpose of driving the tire carrying wheel. Fig. 4 is a diagrammatic representation of a modified arrangement for applying pressure between the tire carrying wheel and the traction drum of the dynamometer and Fig. 5 is a very simplified diagram of connections of the electrical control for the dynamo electric machines of the dynamometer.

Referring to the drawings, the tire 10 to be tested is arranged to be mounted on the tire carrying wheel 11 which is connected so as to be driven by the dynamo electric machine 12 which operates as a motor to rotate the tire in contact with the traction drum 13. The traction drum 13 is mounted on the shaft of the dynamo electric machine 14 which will operate as a generator to provide a load for the tire to be tested. In order to provide for a relative movement between the tire carrying wheel and the traction drum, so as to vary and otherwise regulate the load on the tire to be tested, I have arranged the tire carrying wheel and the motor 12 on a movable platform or support 15. The traction drum 13 and the dynamo electric machine 14 are mounted on a support 16 which may be stationary. The platform 15 is mounted so as to be freely movable back and forth along the runway 17, and to this end the platform is provided with four roller bearing supporting wheels, of which the wheels 18 and 19 are illustrated in the drawing. The platform 15 is arranged to be moved back and forth along the runway 17 by means of the tension device 20. This tension device comprises a stationary support 21 which carries at its upper end a sheave 22, over which the cable 23 is adapted to be passed, one end of the cable being secured in any suitable manner to the weighing device or beam scale 24. The other end of the cable is secured to an adjustable block or nut 25 mounted on an adjusting screw 26. The adjusting screw 26 is carried by a supporting member 27 mounted upon the movable support 15. The adjusting handle 28 connected to the adjusting screw 26 is provided for causing the nut 25 to fleet along the adjusting screw 26 so as to thereby regulate the pressure between the tire to be tested and the traction drum 13.

It will be observed that the arrangement is such that the pressure exerted by the tension device is applied along the line connecting the centers of the shafts on which the traction drum 13 and the tire carrying wheel 11 are mounted and the point of contact between the tire 10 and the traction drum. This is a particularly desirable feature of my invention for the reason that the pressure is applied along this line so as to eliminate the warping strains on the support 15 and the shaft of the motor 12 as well as to eliminate undue strains on the shaft carrying the traction drum 13. It will also be observed that by reason of the provision of a tension device for varying the contact pressure between the tire and traction drum, bending and warping strains are eliminated in the device which regulates the pressure.

The dynamo electric machine 12 is preferably arranged so that its armature 29 is mounted on the shaft which carries the tire carrying wheel and the field frame 30 is also mounted so as to be capable of rotation. The torque between the armature of the motor and the field is measured by means of a suitable beam scale 31 which has a connection with the field frame 30 at 32. The dynamo electric machine 14 is intended to normally operate as a generator and is similarly constructed. The scale of weighing device 33 is provided for measuring the torque between the armature of this machine and the field. It will be observed that since the scale 31 measures the torque of the motor element of the dynamometer and the scale 33 measures the torque of the loading element of the dynamometer, the difference between these two torques, minus known losses, represents the efficiency of the tire in transmitting power.

The tire carrying wheel 11 is shown in Fig. 1 as of the wire wheel type, but it need not necessarily be of this construction and in Fig. 2 I have indicated the wheel 11' as of another type. This wheel is mounted on the shaft 34 of the armature 29 of the electric motor 12. A "full floating" type of axle construction is preferably provided as indicated in Fig. 2. The shaft 34 is mounted in roller bearings 35 which are carried by the field frame 30 of the motor 12. The shaft 34 projects through a rigid tube 36 and connects directly with the wheel 11'. Roller bearings 37 are supported by the tube 36 so that the load carried by the tire to be tested is carried by the rigid tube 36 and the bearing support 38 so as to thereby relieve the shaft 34 of any undue strains. The field frame 30 is also mounted in roller bearings 39 in the pedestal 38 so that this field frame is rotatable with respect to the armature 29. By referring to Fig. 3 it will be observed that the platform or support 15 is carried by the wheels 18 and these wheels are provided with roller bearings 40 so as to minimize the friction and permit the platform 15 to be easily moved back and forth along the rails 17.

As thus constructed and arranged, the operation of this part of my invention is as follows:—

Assume that the motor 12 is operating so as to drive the tire carrying wheel and the tire to be tested and that the adjusting handle 28 of the tension device is adjusted so as to bring the tire into engagement with the traction drum 13, so as to thereby operate the dynamo electric machine 14 as a generator. Assume also that the generator 14 is connected in such a manner as to serve as a loading device for the tire. The adjusting handle 28 will be turned so as to cause the nut 25 to fleet along the adjusting screw 26 in the direction of the adjusting wheel and thereby increase the tension of the cable 23 and at the same time moving the platform 15 so as to apply pressure between the tire to be tested and the traction drum 13. This pressure will be indicated on the balance or weighing device 24 and the pressure may be such as to correspond to the load carried ordinarily by the tire being tested or may be any other value within the limits of the device for the purpose of testing the tire at various loads. It will also be observed that the load may be very easily regulated by varying the adjusting handle 28 and that the pressure set up by the adjusting device is along the line connecting the point of contact between the tire and the traction drum and the centers of the shafts connecting the drum and the tire carrying wheel. The torque of the motor 12 will be indicated on the beam scale 31 and the torque transmitted through the tire and traction drum will be indicated on the beam scale 33. A measure of the efficiency of the tire in transmitting various loads at various speeds may thus be had.

In Fig. 4 I have shown in a very simplified diagram an alternative form of a tension device for applying pressure between the tire carrying wheel 10 and the traction frame 13. In this arrangement a turn buckle connection 41 is used between the scale or load indication device 24' and the post 27', mounted on the platform 15. The turn buckle serves as the connecting medium between the one end of the lever 42 mounted on the pedestal 43, and the other end of the turn buckle is connected by suitable lever mechanism with the load indicating device 24'. The other end of lever 42 is connected with a link 44 which applies a pressure to the post 27' along a line connecting the centers of the shafts carrying the traction drum and the tire carrying wheel, and the point of contact between the tire to be tested and the traction drum. It will be seen that by the provision of the turn buckle adjusting device, a tension regulating device serves to vary the pressure between the tire and the traction drum. As before explained, this tension device has the advantage that adjustable pressure members are eliminated which are necessarily more likely to be subjected to bending strains and binding forces than a pressure device.

The regulation of the speed and the torque transmitted and absorbed by the two elements of the dynamometer is accomplished by the adjustment of the field and armature currents of the two dynamo electric machines. In the preferred form of my invention, provision is made whereby a separate adjustment of the armature and the field circuit resistance of each machine is possible, and the arrangement is further such that the direction of rotation of each machine is easily reversible by reversing the direction of the field current of the respective machines. Provision is also made for the protection of the dynamometer from overload, and to that end a circuit breaker is provided in each armature circuit. A line contactor in the motor circuit serves as a no-voltage release for the motor so as to protect the equipment from excessive speeds, and a no-voltage release on the generator circuit breaker is interlocked with the holding coil of the motor line contactor so as to disconnect the dynamo electric machine from a source of supply in response to abnormal circuit conditions.

By reference to Fig. 5 it will be observed that the motor 12 is indicated as of the direct current type having an armature 29 and a shunt field 30, and the generator is also indicated as of the direct current type having an armature 45 and a shunt field 46. The automatic overload release circuit breaker 47 is provided for connecting the motor armature to the source of supply 48 when the line contactor 49 is closed. The field reversing switch 50 is provided for connecting the motor field 30 to the source of supply in such a manner as to cause the motor to operate in either the forward or reverse direction. The regulating rheostats 51 are provided for varying the excitation of the motor field 30 so as to vary the motor speed. An armature resistance 52 is provided for limiting the motor armature current after the equipment is operating in case such regulation is desirable. The starting push button 53 is provided for controlling the line contactor 49, and the arrangement is such that the contact element of the rheostat 52 must be in such a position that all of the resistance of this rheostat is included in the motor armature circuit before the push button 53 is effective to close the line contactor 49, thereby insuring that the motor will not be connected to the source of supply until the motor armature has sufficient resistance included in its circuit. The push button 54 is provided for deenergizing the line contactor 49 and causing the motor armature to be disconnected from the supply circuit thereby stopping the dynamometer.

The automatic circuit breaker 55 is included in the armature circuit of the generator and the holding coil 56 of this circuit breaker is included in a circuit controlled by the auxiliary switch mechanism of the motor line contactor 49, so that in case the motor line contactor is opened either automatically or under manual control, the generator circuit breaker will also be opened. The generator circuit breaker is also provided with an overload coil 57 so that the breaker will be automatically released in case of an overload on the generator circuit. The adjustable resistor 58 and the resistor 59 are provided for the purpose of a regulable load for the generator. The circuit of these resistors is controlled by means of a double pole double throw disconnecting switch 60 which is so arranged that when thrown to make engagement with its right hand set of contacts, the generator operates as a dynamic brake through the local circuit including the resistors 58 and 59; but when the switch is thrown so as to make engagement with its left hand set of contacts, the generator is connected to the source of supply 48 so as to thereby return power to the supply circuit. When this latter connection is made, the total power used by the dynamometer is merely that which is represented by the losses between the motor and the generator elements of the dynamometer. The current of the generator field circuit is regulated by means of the variable rheostats 61 and the generator field is controlled by the field reversing switch 62 which is provided for the purpose of insuring that the generated potential is in the proper direction to return energy to the supply circuit 48.

As thus constructed and arranged, and with the parts in their respective positions shown in the drawings, the motor disconnecting switch 63, the motor field reversing switch 50, the generator disconnecting switch 60, the generator field reversing switch 62 will all be closed. In order to start the motor, the movable contact mechanism of the motor armature circuit rheostat 52 will be moved clockwise so as to make engagement with the contact buttons 64 and 65. The motor circuit breaker 47 will first be closed and the motor may then be started by pressing the starting push button 53, thereby energizing the line contactor 49 to close and connect the motor to the source of supply through a circuit from the lower supply conductor through the circuit breaker 47, contacts of the line contactor 49, right hand switch blade of the disconnecting switch 63, motor armature, regulating rheostat 52 to the upper supply contactor. The line contactor 49 will be maintained closed through a circuit which includes the auxiliary switch 66 of this line contactor, the stop push button 54, and the contact 67 of the field reversing switch 50. The starting push button 53 may thus be released and the line contactor will be automatically maintained closed. The generator may be connected to the source of supply by closing the circuit breaker 55 and this circuit breaker will be maintained closed by reason of the fact that the no-voltage release coil 56 is energized through a circuit which includes the upper auxiliary switch 68 of the motor line contactor 49 and the auxiliary contact 67 of the motor field reversing switch 50. It is assumed that the switch 60 has been closed so as to connect the generator armature in the local braking circuit which includes the resistors 58 and 59 and that the switch 62 has been closed so as to connect the generator field to the supply circuit for the proper polarity of the generator. The motor armature rheostat 52 may now be varied so as to regulate the current taken by the motor armature, and the field rheostats 51 may also be adjusted so as to regulate the speed of the motor. The generator field rheostat 61 may be adjusted so that the potential of the generator may correspond in polarity and in value to the potential of the supply circuit 48. When the potential and polarity of the generator are properly adjusted, the disconnecting switch 60 may be thrown to make engagement with the left hand contacts so as to cause the generator to return energy to the supply circuit. In case the motor field reversing switch 50 is moved while the equipment is operating, the line contactor 49 will be automatically de-energized and the holding coil 56 of the circuit breaker 55 will be automatically de-energized so that the circuit breaker 55 will automatically open. Protection is thus afforded against over speed conditions due to careless manipulation by the operator. It will also be observed that in case the supply circuit voltage should fail, the line contactor 49 will open, and in opening will automatically effect the opening of the generator circuit breaker 55 so that the equipment must be again started after the occurrence of this abnormal circuit condition.

It will also be observed that the rheostat 52 must be operated so as to include all of the resistance in the motor armature circuit before the equipment can be again started. By observing the power input of the motor and the power delivered by the generator, a measure of the efficiency of the tire at various speeds and load conditions may be had. It will also be observed that the load, the speed and the various other conditions may be adjusted so as to simulate the actual conditions encountered by the tire in actual service.

In accordance with the provisions of the patent statutes I have described the principle of operation of my invention together with the apparatus which I now consider to represent the best embodiment thereof; but I desire to have it understood that the apparatus shown is only illustrative and that the invention may be carried out by other means.

What I claim as new and desire to secure by Letters Patent of the United States, is:

1. A tire testing dynamometer comprising two relatively movable supports, each of said supports having a dynamo electric machine mounted thereon, a wheel for carrying a tire to be tested mounted on one of said supports and connected to be rotated by one of said dynamo electric machines, a drum mounted on the other of said supports and connected to rotate the other dynamo electric machine as a generator in accordance with the rotation of the tire to be tested, and a tension device connected with one of the said supports for applying pressure between the said tire and drum.

2. A tire testing dynamometer comprising two relatively movable supports each having a dynamo electric machine with a shaft mounted thereon, a tire carrying wheel mounted on one of said supports and connected to be operated by the shaft of one of said dynamo electric machines, a drum mounted on the other of said supports and connected to operate the shaft of the other of said dynamo electric machines in accordance with the power transmitted through the tire being tested, and means for applying pressure to one of said supports on a line connecting the centers of the said shafts and the point of contact between the tire to be tested and the said drum.

3. A tire testing dynamometer comprising two relatively movable supports each having a dynamo electric machine mounted thereon, a tire carrying wheel mounted on one of said supports and connected to be operated by one of the said dynamo electric machines, a drum mounted on the other of said supports and connected to operate the other of said dynamo electric machines in accordance with the power transmitted through the tire being tested, and a tension device connected with one of said supports and located on a line connecting the centers of the shafts which carry the said drum and wheel and the point of contact between the tire to be tested and the drum for varying the contact pressure between the tire and the drum.

4. A tire testing dynamometer comprising two relatively movable supports each having a dynamo electric machine with a shaft mounted thereon, a tire carrying wheel mounted on one of said supports and connected to be operated by the shaft of one of said dynamo electric machines, a drum mounted on the other of said supports and connected to operate the other of said dynamo electric machines in accordance with the power transmitted through the tire being tested, and a variable tension device cooperating with one of said supports for moving the same to apply pressure along a line connecting the centers of said shafts and the point of contact between the point of the tire to be tested and the said drum.

5. A tire testing dynamometer comprising two relatively movable supports each having a dynamo electric machine mounted thereon, each of said machines having a rotatable stator element and a rotor element with a shaft, a torque measuring device connected with each of said stator elements, floating type bearings for the shafts of said dynamo electric machines, a tire carrying wheel on the shaft of one of said dynamo electric machines and a traction drum on the shaft of the other of said dynamo electric machines, and means for applying pressure along a line connecting the centers of said shafts and the point of contact between the tire to be tested and the said drum.

6. A tire testing dynamometer comprising two relatively movable supports each having a dynamo electric machine with a shaft mounted thereon, a tire carrying wheel mounted on one of said supports and connected to be operated by the shaft of one of said dynamo electric machines, a drum mounted on the other of said supports and connected to operate the shaft of the other of said dynamo electric machines in accordance with the power transmitted through the tire being tested, a pedestal mounted on one of said supports, a wheel carried by a stationary pedestal and a cable passing over the said wheel, a measuring device connected to one end of said cable, and a device cooperating with said pedestal and connected to the other end of said cable for applying pressure along the line connecting the centers of the said shafts and the point of contact between the tire to be tested and the drum.

7. A tire testing dynamometer comprising two relatively movable supports, each of said supports having a dynamo electric machine mounted thereon, a wheel for carrying a tire to be tested mounted on one of said supports and connected to be rotated by one of said dynamo electric machines operating as a motor, a drum mounted on the other of said supports and connected to rotate the other dynamo electric machine as a generator in accordance with the rotation of the tire to be tested, an automatic circuit breaker in the circuit of said generator, a line contactor in the circuit of said motor, and interlocking connections between the said circuit breaker and contactor whereby the contactor and circuit breaker are both automatically opened in response to abnormal circuit conditions.

In witness whereof, I have hereunto set my hand this 12th day of April, 1923.

CARL F. SCOTT.